(12) United States Patent
Cheng

(10) Patent No.: US 6,729,725 B1
(45) Date of Patent: May 4, 2004

(54) RIMLESS EYEGLASSES

(75) Inventor: Siu Kwong Cheng, Hong Kong (HK)

(73) Assignee: United Creation Optical Company Limited, Kowloon (HK)

( * ) Notice: Subject to any disclaimer, the term of this patent is extended or adjusted under 35 U.S.C. 154(b) by 0 days.

(21) Appl. No.: 10/387,511

(22) Filed: Mar. 14, 2003

(51) Int. Cl.[7] .................................................. G02C 1/02
(52) U.S. Cl. ...................................... 351/110; 351/124
(58) Field of Search .............................. 351/110, 136, 351/124, 41

(56) References Cited

U.S. PATENT DOCUMENTS 5,450,141 A  *  9/1995  Kobayashi .................. 351/110

* cited by examiner

Primary Examiner—Hung X. Dang
(74) Attorney, Agent, or Firm—Jacobson Holman PLLC

(57) ABSTRACT

A rimless eyeglass frame with the lenses secured to hinge portions of the temples and to the bridge by a threaded bolt and nut assembly with the hinge portions and bridge including two projecting teeth at each connection to the eyeglass lenses and with the projecting teeth gripping the eyeglass lenses and helping to secure them in place.

16 Claims, 6 Drawing Sheets

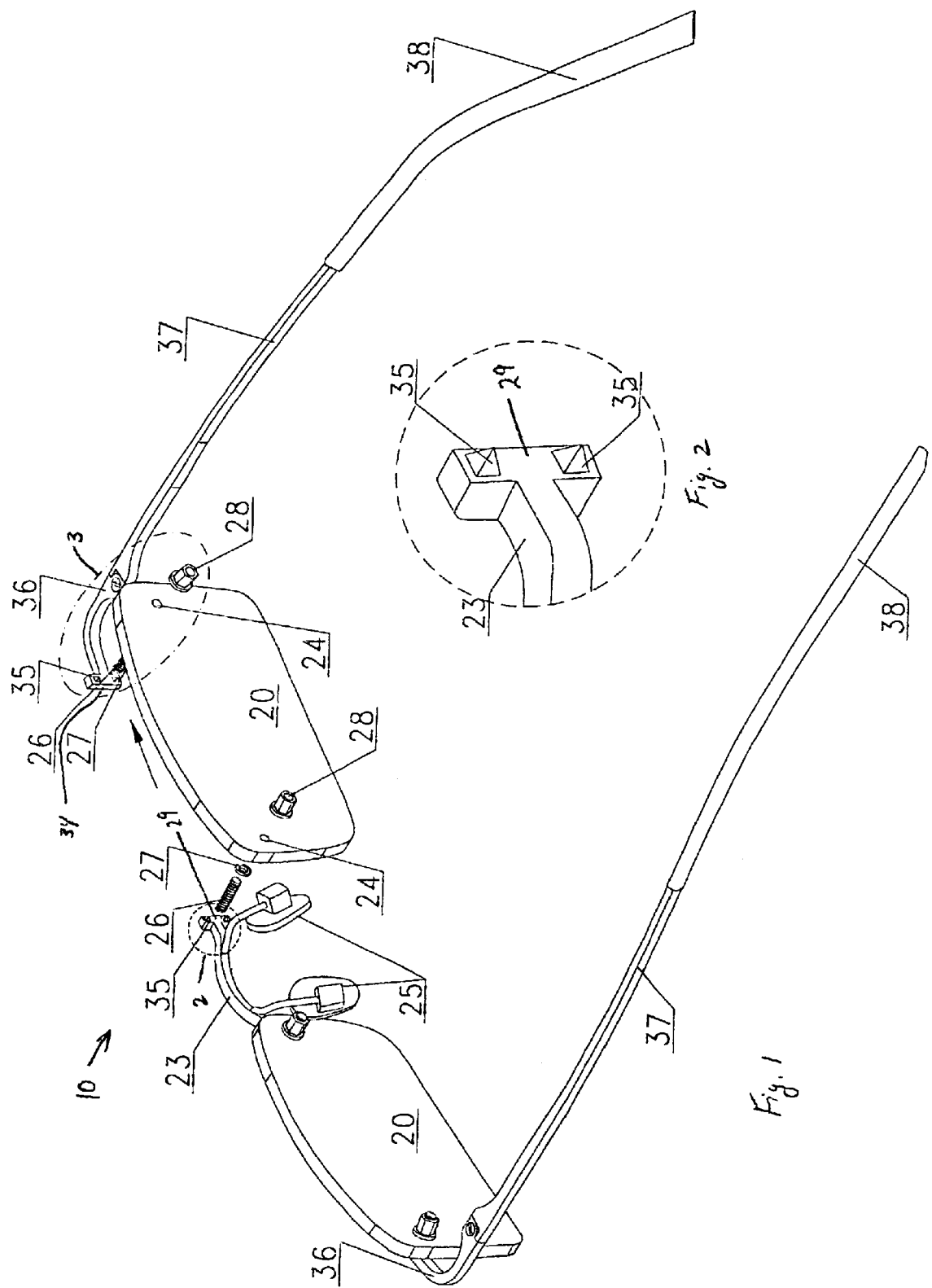

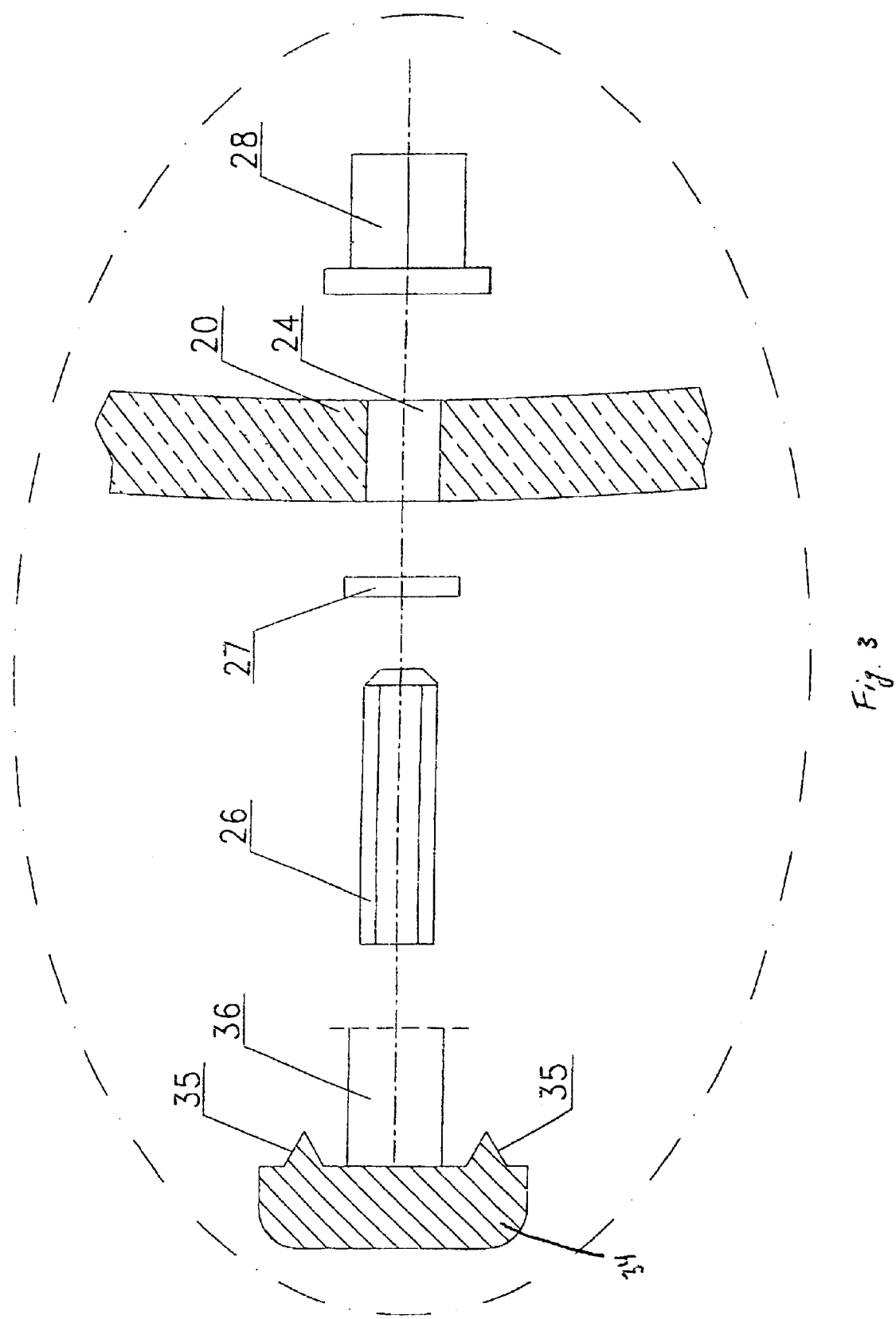

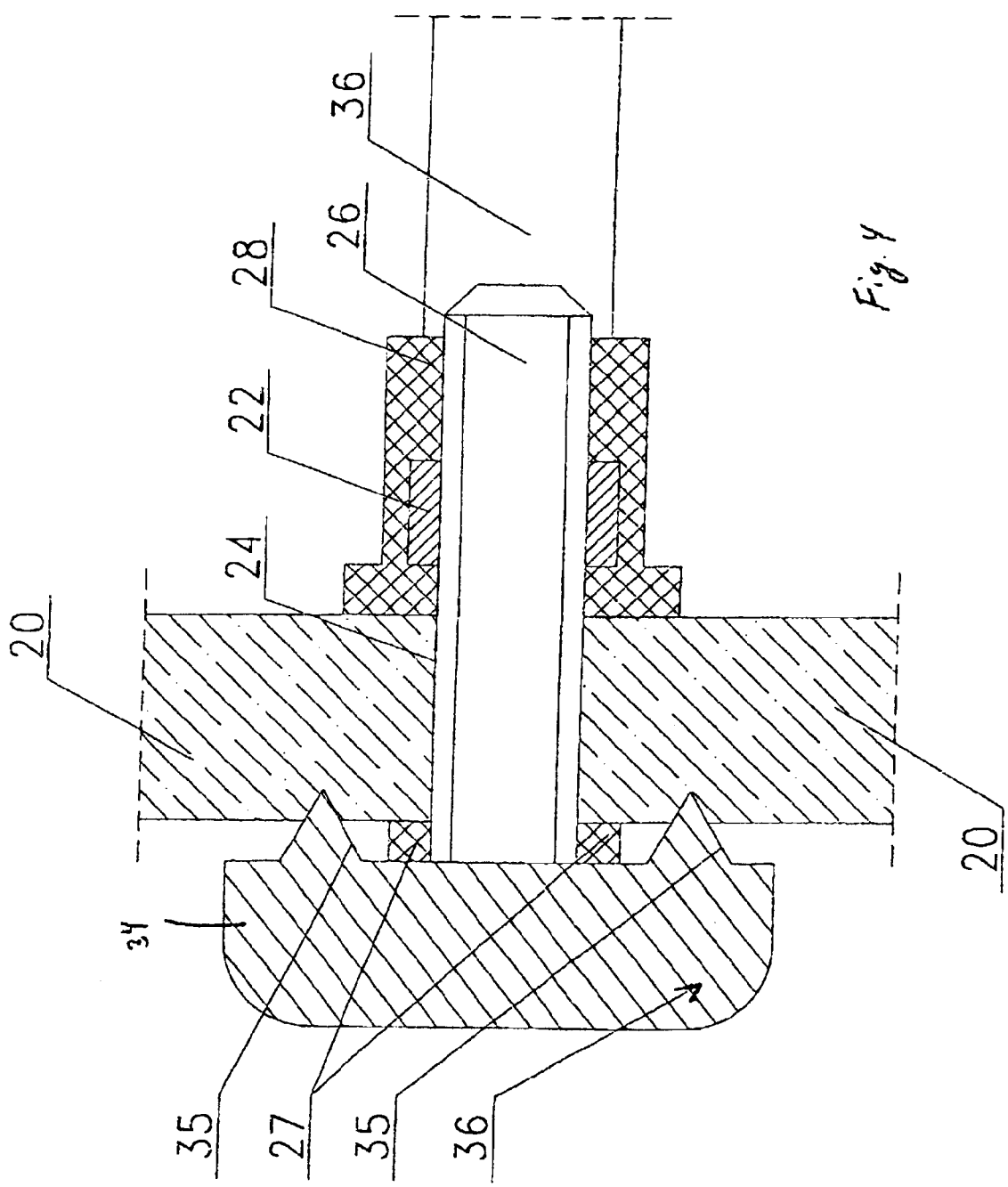

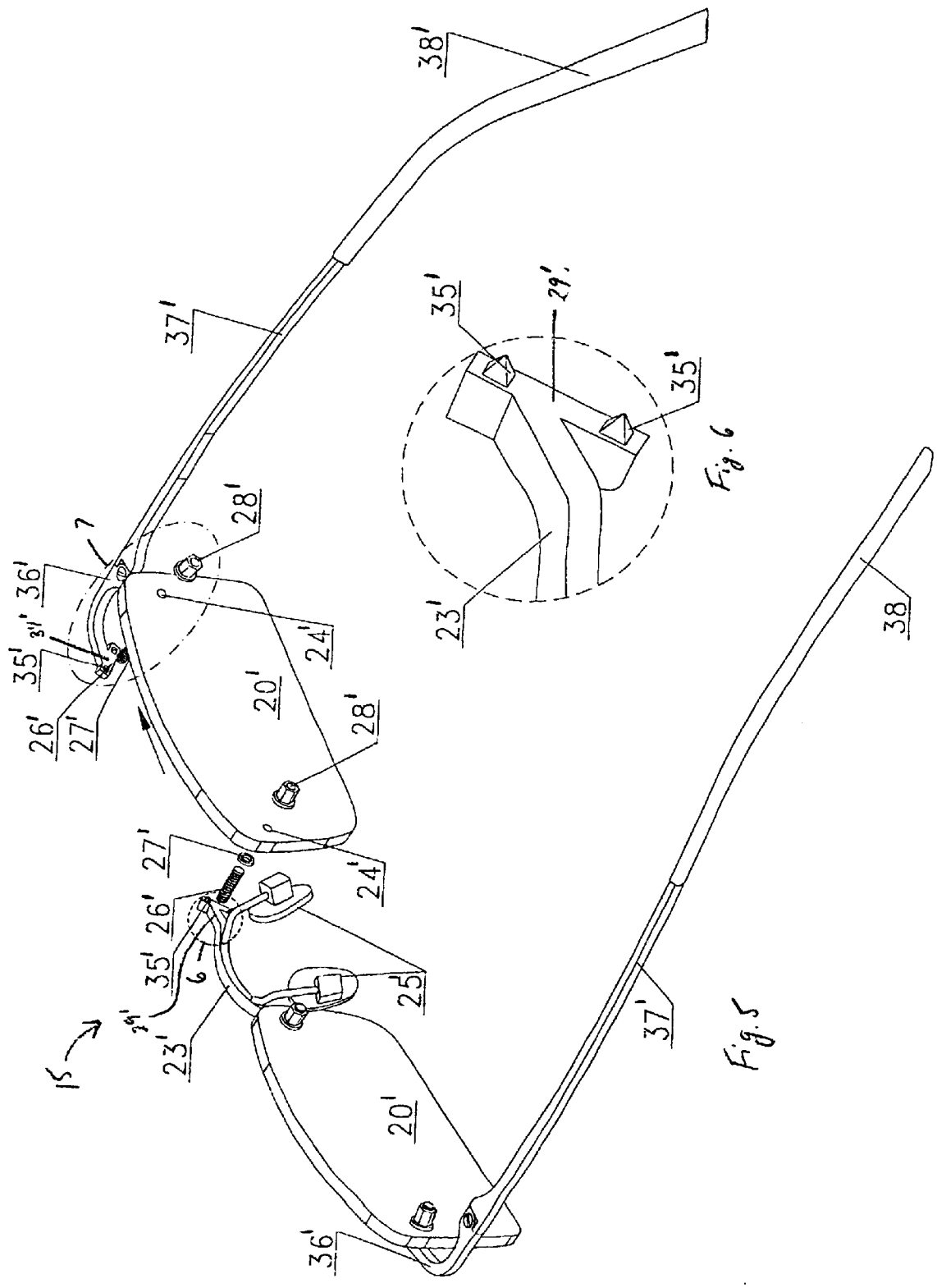

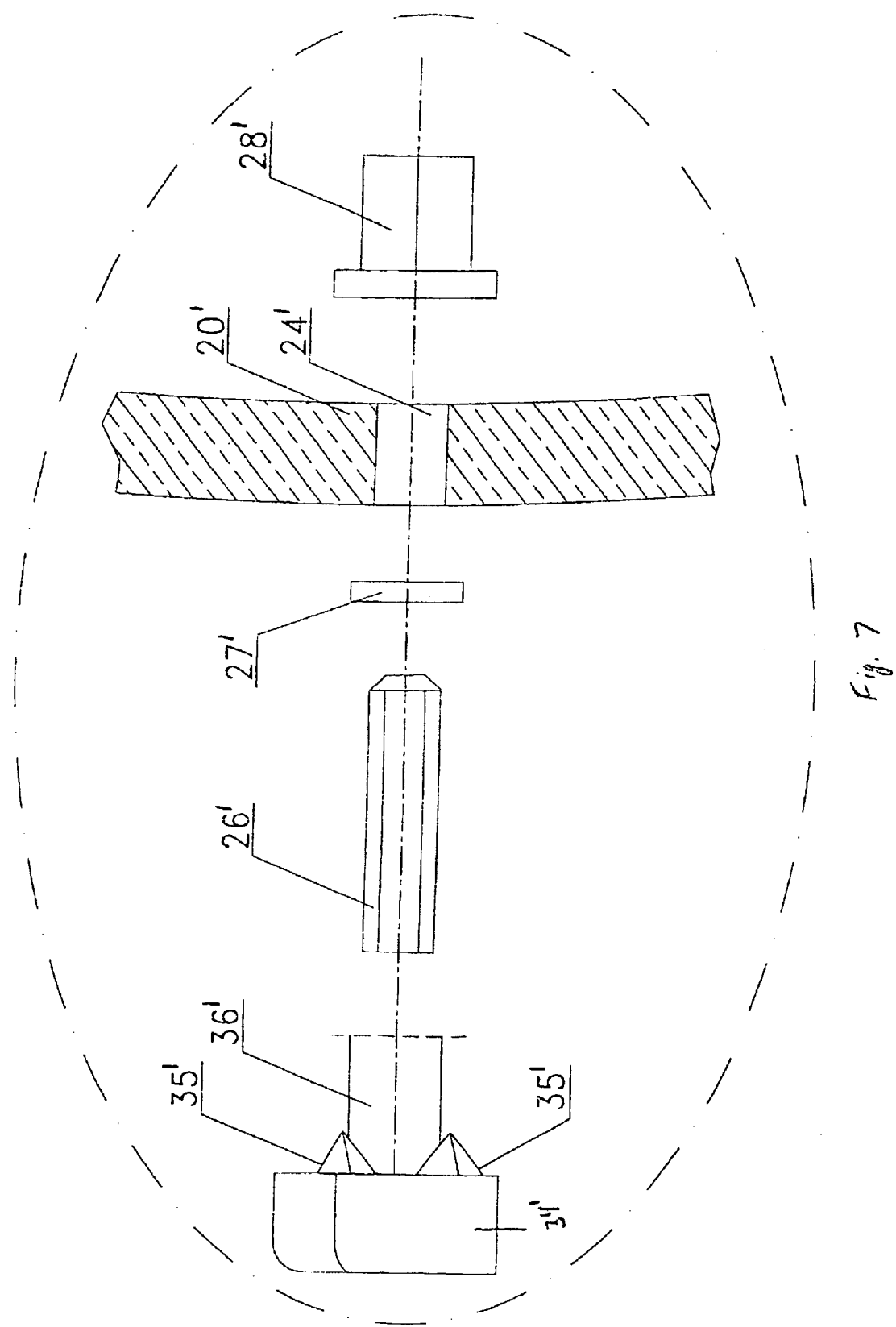

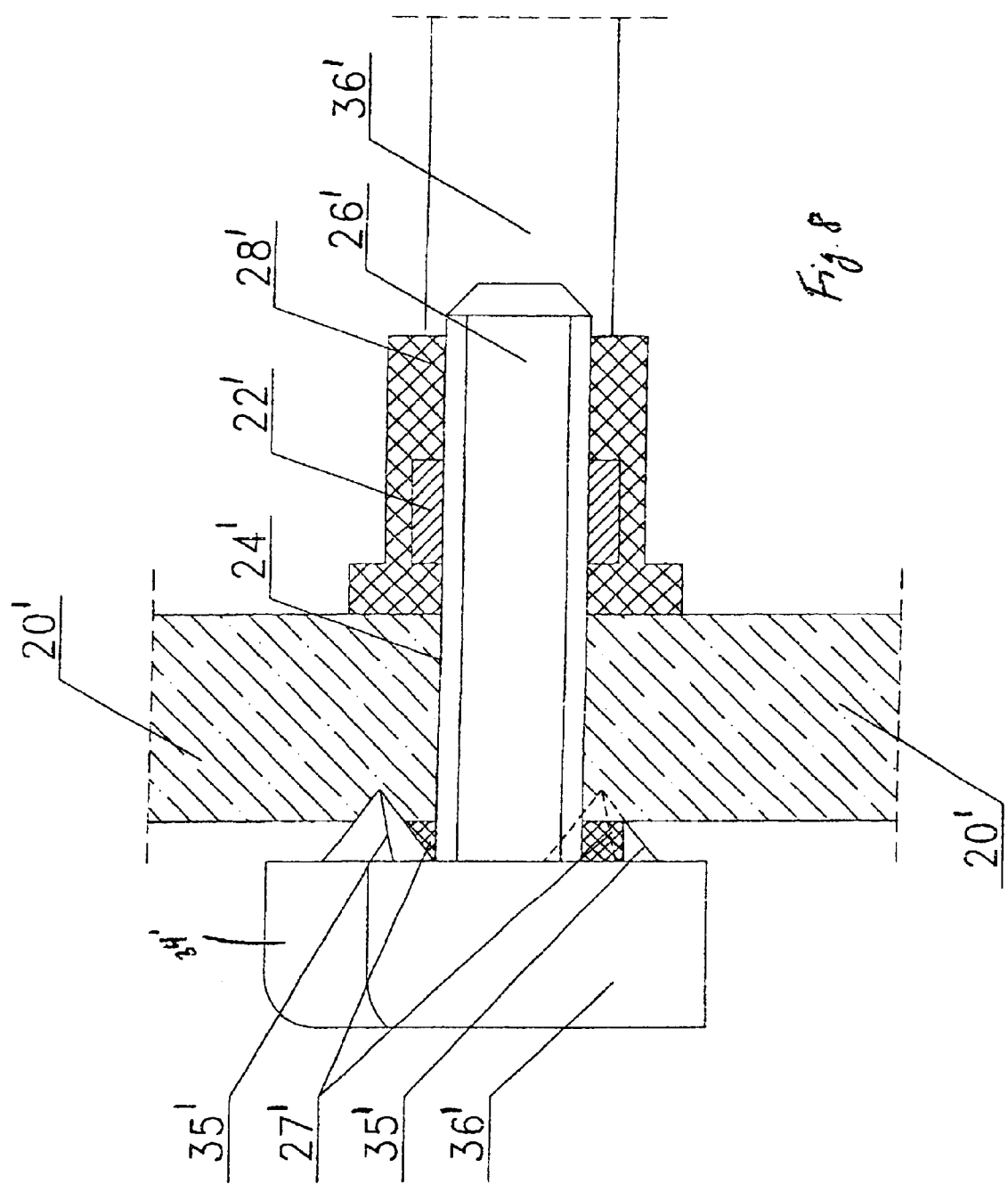

RIMLESS EYEGLASSES

FIELD OF THE INVENTION

The present invention relates to the field of eyeglasses, and particularly rimless eyeglasses, where connection is made between the hinged portion of the temple and the eyeglass lenses, preferably plastic lenses, and also a connection is made between the bridge and the eyeglass lenses.

BACKGROUND OF THE INVENTION

Eyeglasses have been available for many centuries. Over time, the design of eyeglasses have varied considerably according to fashion and taste.

Modern day eyeglass lenses are available in a rimless variety; without an eyeglass lens enclosing frame or rim. In these designs, eyeglass lenses are secured directly to the hinge portion of the temple and to the bridge by various arrangements.

SUMMARY OF THE INVENTION

An advantageous arrangement for securing eyeglass lenses to the hinge portions of the temples and to the bridge of the frame will be described. By the present invention, each eyeglass lens includes two holes located adjacent to the peripheral edge where the hinge portion of the temple and the bridge will be secured to the eyeglass lens. At each of these holes, a threaded bolt secured at one end respectively to the hinge portion of the temple and the bridge passes through the hole and through an elastomer cushioning ring for engagement with a nut assembly on an opposite side of the eyeglass lens. Each of the hinge portions of the temples and the bridge portions include two projecting teeth in the shape of pyramids for engaging with, penetrating into and rigidly holding the eyeglass lens which is preferably made of plastic when the nut assembly is tightened on the threaded bolt.

The hinge portions of the temples and the portions of the bridge which engage the eyeglass lenses may be aligned at any angle with respect to the lenses as long as the two projecting teeth engage the lenses and the threaded bolt is able to pass through the pre-drilled hole located on opposite edges on each eyeglass lens. Accordingly, the crossbar on which the two projecting teeth are located may be aligned vertically or horizontally or at any angle in between.

Accordingly, it is an object of the present invention to provide a rimless eyeglass frame with the lenses secured to hinge portions of the temples and to the bridge by a threaded bolt and nut assembly.

It is yet another object of the present invention to provide a rimless eyeglass frame with the lenses secured to hinge portions of the temples and to the bridge by a threaded bolt and nut assembly with the hinge portions and bridge including two projecting teeth at each connection to the eyeglass lenses.

It is still yet another object of the present invention to provide a rimless eyeglass frame with the lenses secured to hinge portions of the temples and to the bridge by a threaded bolt and nut assembly with the hinge portions and bridge including two projecting teeth at each connection to the eyeglass lenses and with the projecting teeth gripping the eyeglass lenses and helping to secure them in place.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 1 is a perspective view of the eyeglass frame of the present invention with one of the lenses shown in an exploded view and certain areas encircled and labeled as two and three, respectively.

FIG. 2 is an enlargement of part of the area encircled and labeled as two in FIG. 1.

FIG. 3 is an enlarged exploded view of the area encircled and labeled as three in FIG. 1.

FIG. 4 is an enlarged cross-sectional view illustrating the interconnection of a hinge portion and eyeglass lens illustrative of the four interconnections used to form the rimless frame of the present invention.

FIG. 5 is an alternative embodiment of the present invention illustrating with one of the lenses shown in an exploded view and certain areas encircled and labeled as six and seven, respectively.

FIG. 6 is an enlargement of part of the area encircled and labeled as six in FIG. 5.

FIG. 7 is an enlarged exploded view of the area encircled and labeled as seven in FIG. 5.

FIG. 8 is an enlarged cross-sectional view illustrating the interconnection of a hinge portion and eyeglass lens illustrative of the four interconnections used to form the rimless frame of the present invention.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 4 in particular, a rimless eyeglass frame embodying the teachings of the present invention is generally designated as 10. With reference to its orientation in FIG. 1, the rimless eyeglass frame includes two temples 37 which terminate in end pieces 38. At the opposite end from the end pieces 38 of the temple 37 are hinge portions 36. One end of each hinge portion 36 is pivotally mounted by a screw interconnection to the temple 37. In an alternate embodiment, the temple 37 and end pieces 38 may be of unitary construction.

The opposite end of the hinge portion terminates in a cross-bar 34 having two teeth projections 35 which are pyramid shaped. Each projection 35 is approximately 1 mm wide.

Centrally located between two eyeglass lenses 20 is a bridge 23 terminating in two crossbars 29 at opposite ends of the bridge 23. Also mounted on the bridge 23 are tabs or nose pads 25.

On opposite sides of each of the eyeglass lenses 20 are only two holes 24 for cooperation with the crossbars 34 of the hinge portions 36 and the crossbars 29 of the bridge 23. The two holes 24 of each lens cooperate with threaded bolts 26, elastomer O-ring 27 and nut assembly 28 for securing the lenses 20 to the bridge and temple portions. The threaded bolts have a diameter of approximately 1 mm which fits snugly into holes 24.

As shown in an enlarged view in FIG. 2, the bridge 23 terminates in crossbar 29 having teeth 35 for engaging with and penetrating into a surface of an eyeglass lens 20. In FIG.

3, hinge portion 36 terminating in crossbar 34 also includes teeth 35. Also shown is the threaded bolt 26, elastomer O-ring 27, lens 20, having aperture 24, and nut assembly 28.

In FIG. 4, the assembled hinge portion secured to lens 20 is shown. It is understood that a similar arrangement for interconnection of the crossbars 29 of bridge 23 with the lenses 20 is similarly accomplished. In FIG. 4, only upon rotation of nut assembly 28 engaging with threaded bolt 26 which extends from and is secured to crossbar 34 of hinge portion 36, do the teeth 35 engage with and penetrate into the lens 20, preferably made of plastic. The nut assembly includes a rotatable sleeve having an internal nut 22 which engages threaded bolt 26. The elastomer O-ring 27 is compressed by the rotation of the nut assembly around the threaded bolt so as to cushion the tightening and engagement of the points of the teeth 35 with the lenses 20.

It is understood as being within the scope of the present invention that the nut assembly 28 may consist of an end cap which covers the free end of the threaded bolt and threadingly engages the threaded bolt for securing the lenses to the crossbars 29 and 34. Also, the nut assembly may constitute two separate threaded components, for example a nut and an end cap which are successively threaded onto the free end of the threaded bolt 26 so as to compress the O-ring 27 and force engagement of the lenses 20 with the crossbars 29 and 34.

In FIGS. 5 through 8, an alternate arrangement is shown. In these Figures, all parts of the assembly shown in FIGS. 1 and 4 which are shown in FIGS. 5 through 8 are similarly numbered with the prime designation.

In FIG. 6, the eyeglass frame 15 is similarly structured as shown in FIGS. 1 through 4. However, as noted in FIGS. 5, 6 and 7, the crossbars 29' and 34' are at a steeper angle compared to the vertically extending crossbars 29 and 34 shown in FIGS. 1 through 3. The angle of inclination of the crossbars 29' and 34' may be varied to any angular extent and be able to perform a similar anchoring of eyeglass lenses to a hinge portion and bridge of a rimless eyeglass frame assembly while experiencing the benefits of the present invention.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. An eyeglass frame comprising:
   two plastic lenses,
   two temples,
   each of said two temples terminating in a temple crossbar at one end of each of the two temples,
   a bridge terminating in two bridge crossbars located at opposite ends of the bridge,
   each of said two lenses including only two holes,
   each of the temple crossbars and each of the bridge crossbars include a bolt secured to the crossbars and a free end of the bolts extending through the two holes of the two lenses,
   a nut assembly secured to the free end of each bolt to secure the two lenses between the two temples and the bridge, and
   each of the two bridge crossbars and the temple crossbars include two projecting teeth with the bolt being located between the two projecting teeth for engaging with and penetrating into a surface of the two lenses by points of the projecting teeth only when the nut assembly is tightened on the bolts.

2. An eyeglass frame as claimed in claim 1, wherein the projecting teeth are pyramid shaped.

3. An eyeglass frame as claimed in claim 1, wherein an elastomer O-ring is located between the two bridge crossbars and the temple crossbars.

4. An eyeglass frame as claimed in claim 3, wherein the elastomer O-ring surrounds the bolts projecting from the two bridge crossbars and the temple crossbars.

5. An eyeglass frame as claimed in claim 1, wherein each of the bolts is threaded.

6. An eyeglass frame as claimed in claim 5, wherein each of the bolts have a diameter of 1 mm.

7. An eyeglass frame as claimed in claim 1, wherein each of the two bridge crossbars and the temple crossbars extend vertically.

8. An eyeglass frame as claimed in claim 1, wherein each of the two bridge crossbars and the temple crossbars extend at an angle to vertical.

9. A rimless eyeglass frame comprising:
   two plastic lenses,
   two temples,
   each of said two temples terminating in a temple crossbar at one end of each of the two temples,
   a bridge terminating in two bridge crossbars located at opposite ends of the bridge,
   each of said two lenses including only two holes,
   each of the temple crossbars and each of the bridge crossbars include a bolt secured to the crossbars and a free end of the bolts extending through the two holes of the two lenses,
   a nut assembly secured to the free end of each bolt to secure the two lenses between the two temples and the bridge, the nut assembly including a threaded nut encased in a rotatable sleeve, and
   each of the two bridge crossbars and the temple crossbars include two projecting teeth with the bolt being located between the two projecting teeth for engaging with and penetrating into a surface of the two lenses by points of the projecting teeth only when the nut assembly is tightened on the bolts.

10. An eyeglass frame as claimed in claim 9, wherein the projecting teeth are pyramid shaped.

11. An eyeglass frame as claimed in claim 9, wherein an elastomer O-ring is located between the two bridge crossbars and the temple crossbars.

12. An eyeglass frame as claimed in claim 11, wherein the elastomer O-ring surrounds the bolts projecting from the two bridge crossbars and the temple crossbars.

13. An eyeglass frame as claimed in claim 9, wherein each of the bolts is threaded.

14. An eyeglass frame as claimed in claim 13, wherein each of the bolts have a diameter of 1 mm.

15. An eyeglass frame as claimed in claim 9, wherein each of the two bridge crossbars and the temple crossbars extend vertically.

16. An eyeglass frame as claimed in claim 9, wherein each of the two bridge crossbars and the temple crossbars extend at an angle to vertical.

* * * * *